United States Patent [19]

Currie et al.

[11] 3,882,504
[45] May 6, 1975

[54] PROCESS OF AND APPARATUS FOR PROVIDING FILTER DISCRIMINATION BETWEEN RECEIVED DIRECT IMPULSES AND DELAYED PULSES AS IN PULSE NAVIGATION AND RELATED APPLICATIONS

[75] Inventors: John M Currie, Westford; Herbert L. Brown, Cohasset, both of Mass.

[73] Assignee: International Navigation Corporation, Bedford, Mass.

[22] Filed: Nov. 2, 1973

[21] Appl. No.: 412,249

[52] U.S. Cl. ............... 343/103; 325/323; 333/70 A
[51] Int. Cl. ............................................. G01s 1/24
[58] Field of Search .................... 343/103; 325/323; 333/70 A

[56] References Cited
UNITED STATES PATENTS
3,388,330  6/1968  Kretzmer ........................... 325/323
3,403,345  9/1968  Frank et al. ...................... 333/70 A

*Primary Examiner*—Malcolm F. Hubler
*Assistant Examiner*—Richard E. Berger
*Attorney, Agent, or Firm*—Rines and Rines; Shapiro and Shapiro

[57] ABSTRACT

This disclosure deals with a novel combined filter using, preferably, a combination of limited pole elliptical and synchronous filters, for discriminating between direct and delayed radio-frequency impulses (as in Loran C or similar reception applications), while rejecting in-band and far-removed frequencies of proximal sources and the like.

13 Claims, 2 Drawing Figures

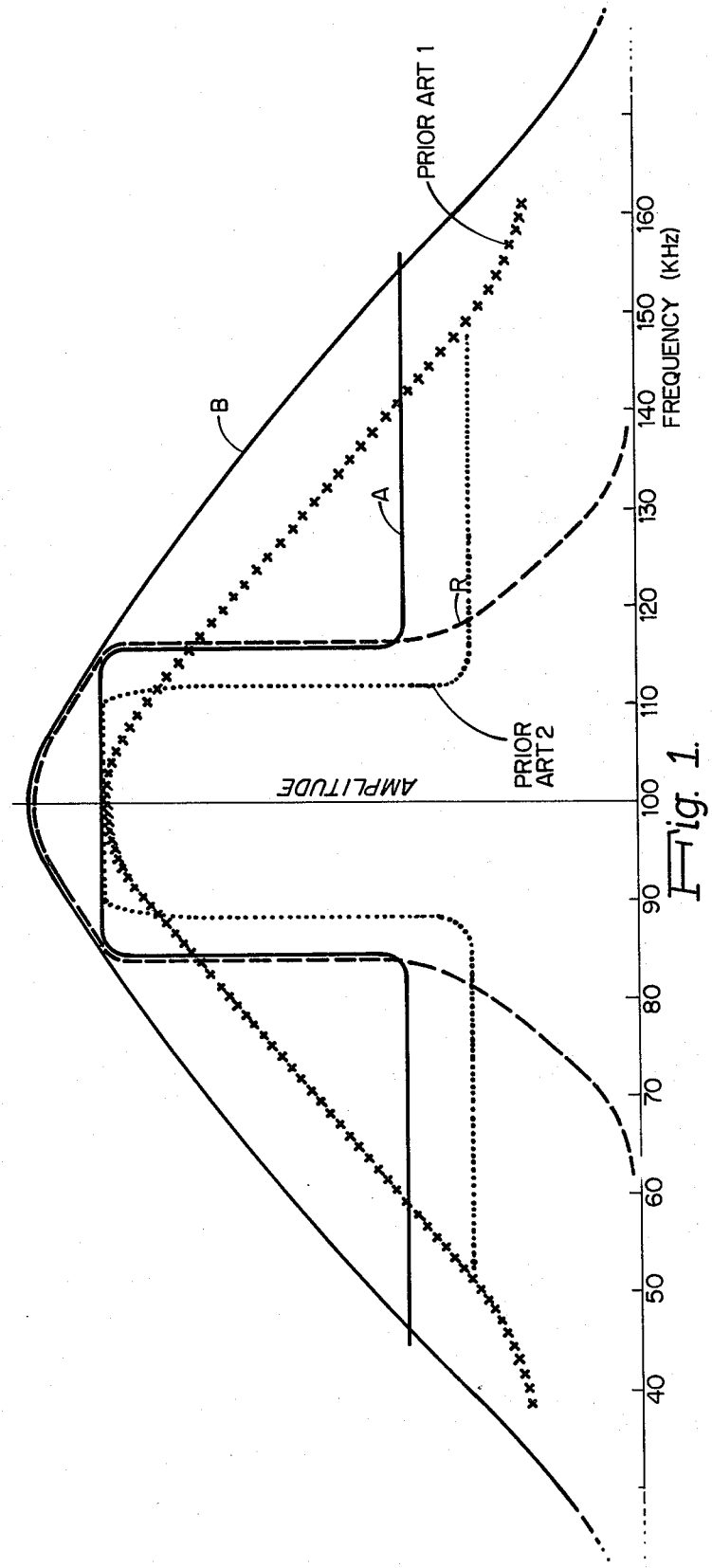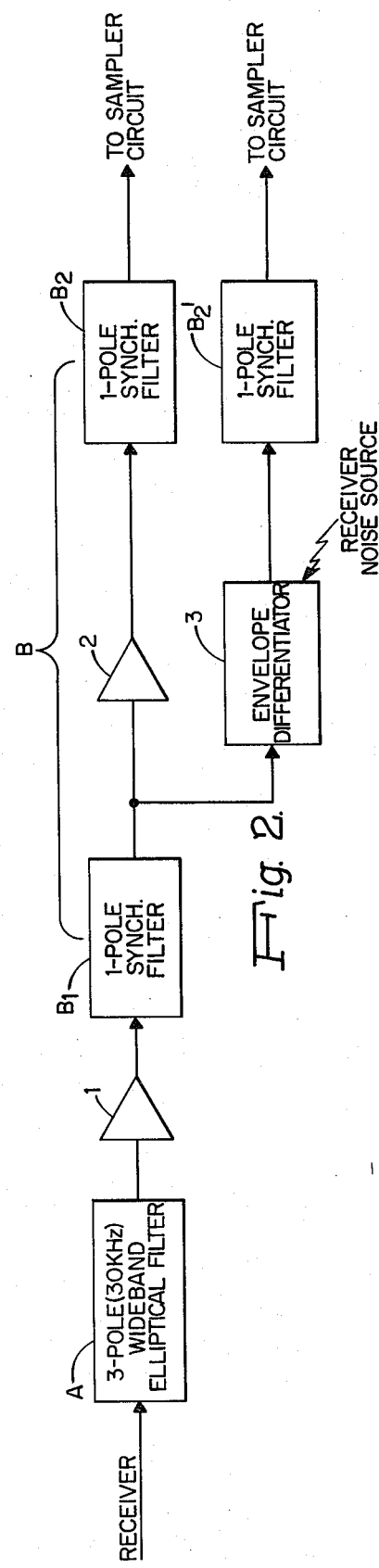

PROCESS OF AND APPARATUS FOR PROVIDING FILTER DISCRIMINATION BETWEEN RECEIVED DIRECT IMPULSES AND DELAYED PULSES AS IN PULSE NAVIGATION AND RELATED APPLICATIONS

The present invention relates to processes and apparatus for filter-discriminating the signals or impulses received in pulse navigation systems, such as Loran C and the like, or in other applications where a steeply rising impulse is followed by a delayed impulse resulting from echoing, scattering and some similar phenomenon, including multi-path reception as by sky-wave propagation, as distinguished from ground-wave transmission.

Underyling the problem of receiving Loran or similar signals, are the following considerations, among others. First, the bandwidth of the receiver filter must be wide enough such that the ground- and sky-wave radio-frequency impulse signals are not smeared together so as to produce an error in the expected arrival time of the ground-wave signal caused by variabilities in the multi-path delayed echo. Secondly, the filter should be narrow enough, and in some cases of sufficiently sharply dropping skirts, to eliminate close-in interferences in the near frequency. As an example, the carrier frequency may be 100 kilohertz (kHz); but there might be another transmitter associated with other navigation services, such as Decca systems or the like, sending 130 kHz interfering signals which should be eliminated or at least reduced by 30 to 40 decibels. A third consideration is that other thoroughly unrelated serivces, such as communications gear on the same vessel carrying the navigation receiver, operating even at much higher frequencies, say twenty times the 100KHz frequency, must be reduced very much in signal amplitude (preferably over 100 db) because of the physical closeness of the transmitter.

The filtering system of a Loran C receiver or the like, thus should include the capabilities for sufficiently wideband reception not to smear together the ground- and sky-wave signals, but it must be narrow enough at the close-in frequency areas, to eliminate quasi in-band interference, as from another navigation system in the same portion of the spectrum, and, additionally be capable of rejecting by 120 db or so an on-board interfering signal that may be used for some other widely different purpose. A final consideration is that the filter system should reduce high frequency noise generated inherently in differentiating and other circuits of the receiver.

While the above considerations and problems have been described in specific connection with the reception on shipboard (or similar reception) of Loran C navigation signals and the like, it will be immediately evident that these and related problems, or some of them, also occur in other communication systems. The invention, thus, is equally applicable for the elimination of these and similar problems in other areas and applications, as well, though the invention is herein described in connection with its preferred application to the Loran C shipboard or related functions.

Heretofore, however, the art has not evolved the novel filtering methodology or technique underlying the present invention for the solution of the present or similar problems. To the contrary, as described, for example in the Sperry Gyroscope Manual HB-13-0003, July, 1966, An/ARN-85, Loran C receiver filtering has iinvolved a three-pole synchronized tuned filter, centered at 100 KHz for Loran C operation, and having an overall bandwidth of 23 kHz. This bandwidth was selected in order to permit resolving the time difference between ground-wave and sky-wave signals the delay of which could be as short as 30 microseconds. It was designed in such a way that the contamination from a sky-wave signal 30 db larger than the ground-wave signal, with such a short delay as 30 microseconds, would not permit more than one-sixtieth of the amplitude at the third cycle to be composed of sky-wave information. For higher and higher frequencies, the filter pass continually rolled off; that is, reduced in amplitude any interfering signals at the rate of 18 db per octave, as schematically shown in the amplitude versus frequency response of FIG. 1, later described, indicated by the curve labelled "Prior Art 1." Thus, at 11½ kHz from 100 kc, the signals are down 3 db; 11½ kHz further away, down 21 db; at 144 kHz, down a further 18db; and so on. At much higher frequencies, like 2 or 3 megaHertz, the filter response drops down sufficiently that any on-board, proximal VHF transmitter, for example, would have its transmissions reduced in amplitude to the point where they would not interfere with the received Loran signals. One of the principal difficulties with such filtering approaches to Loran C reception, however, resides in the fact that such response characteristics, designed for the very small percentage of time that the before-mentioned deleterious sky-wave conditions occur, cannot adequately prevent the interference of operating at 73, 83, 113 or 129 kHz. A Decca frequency at 129 kHz, for example, only five miles away, can be 30 db larger at the output of the filter than a Loran C signal from 1,000 miles away, the filter response at 129 kHz being inherently higher than was necessary for just adequate sky-wave, ground-wave resolution. Unfortunately, the inherent type of bell-shaped (Bessel function) roll-off versus frequency characteristic of such a synchronous tuned filter always presents this problem, enabling only a compromised type of operation under circumstances as above described.

Another prior-art approach to a solution to this problem has involved a filter whose response was very steep, as in the Litton LRN 101 navigation receiver proposed to the U.S. Coast Guard on or about June of 1971, as described in its LRN101 manual. Such a filter characteristic, illustrated as the curve labelled "Prior Art 2" in FIG. 1, was flat across the top, had a bandwidth (at 3 db) which approximated that of the aforementioned Sperry filter ("Prior Art 1"), approximately 20 kHz. The response is so steeply sided because of the high number of poles involved, however, that its delay or smearing together of ground-wave and sky-wave signals introduced contamination far higher than the 35 db of by the prior Sperry filter systems.

In accordance with the present invention, on the other hand, it has been surprisingly found that a particular type of combined filter response admirably solves all of the problems above discussed at one and the same time, and with none of the disadvantages previously recited. Specifically, in summary, it has been found that by using a first limited-pole filter (preferably elliptical) whose rectangular step-function characteristics are known to provide very good skirt selectivity, by using only a few poles with a relatively wide central frequency, one can allow the pulse information of interest to come through without undue smearing of direct or fresh pulses and delayed pulses. This filter, in combination with another kind of second limited-pole filter (preferably two-pole synchronous), whose characteristics are such that they are also of a very wide nature but of bell-shaped substantially Bessel function successively reduced response in amplitude for frequencies sucessively removed from the central frequency, can provide a combined response which has minimum smearing, adequate rejection of in-band interference, and simultaneously good enough rejection of the far-removed frequencies to enable vastly improved utilization in Loran C and related navigation uses.

An object of the invention, accordingly, is to provide a new and improved process of and apparatus for filtering discrimination between received direct impulses and delayed impulses, as well as rejection of in-band and proximately transmitted far-removed frequencies, such as occur in shipboard or similar operations of Loran C navigation systems and the like.

A further object is to provide a novel filtering process and apparatus of more general applicability, as well.

Other and further objects will be explained hereinafter and are more particularly delineated in the appended claims.

The invention will now be described in its illustrative application to Loran C and similar systems, in connection with the accompanying drawing, the before-mentioned FIG. 1 of which contains amplitude versus frequency responses of prior art approaches to the filtering problem of the invention, as well as the preferred novel combined filter response of the invention; and FIG. 2 is a block diagram of a preferred circuit structure for attaining the combined responses of FIG. 1.

Since the delay of a filtered is determined by the slope of the phase characteristic at the center frequency, the elliptical filter, which has a relatively small phase slope at the center frequency, will pass the frequency components of a signal near the center frequency with very little distortion and time delay. Therefore one can use the elliptical filter if its bandwidth is wide compared with the transmitted bandwidth. For the frequency components of the signal impulse more remote from the narrow region near the center frequency, however, the elliptical functon characteristic provides a very high rate of change of phase with frequency, thus resulting in distortion and time delay. In accordance with the invention, it has been found that when an elliptical filter response is linearly combined with a bell-shaped Bessel function, or synchronous tuned, or other filter of that type, in the critical manner taught, the elliptical filter can provide bandwidth sufficiently wide to pass the signal without distortion and delay, and then pass the signal through the Bessel or other similar filter of sufficient bandwidth to make the time delay insignificant, thus producing an overall response having the sharp or steep skirt selectivity of the elliptical filter without forcing a sky-wave, ground-wave smearing; and at the same time having the desirable outer band high attenuation of a Bessel or other filter—again without sufficient significant delay to cause ground-wave and sky-wave smearing.

Referring to FIG. 1, the frequency spectrum of the Loran C radio-frequency pulse transmission will extend on either side of 100 kHz center frequency, with the early rising portion (before any delayed echoes occur) having components of the order of less than 35 db down that are at least 10 kHz away from the center frequency. The previously described Sperry filter approach ("Prior Art 1"), was adequate in that it did not upset the components arriving from the receiving antenna since, at a frequency 10 kHz removed from the 100 kHz carrier, the filter response had dropped very little. It suffered the problem, however, as before explained, of not providing adequate interference rejection from previously described other source signals. On the other hand, the filter provided by Litton ("Prior Art 2") definitely eliminated near-band interfering signals; but its amplitude response dropped so rapidly at about 90 kHz as to guarantee distortion of that portion of the Loran side bands being received. At a further point, such as 80 khz away, moreover, the distortion provided to those side bands was such as to render the pulse almost unusable in cycle selection and similar circuits. In addition its rejection to 20 times the operating frequency was inadequate.

In accordance with the present invention, however, a resultant response R is produced which from one point of view, is somewhat of a composite of the prior art responses illustrated in FIG. 1; though entirely differently and critically oriented and tuned to attain the overall linearly combined envelope R that cannot be attained just by mere combination of the filtering systems of the prior art. Specifically, in the preferred embodiment, a limited number of poles, preferably three, wideband 30 kHz elliptical filter A (FIG. 2) is first employed to produce minimum phase distortion over the predetermined band of interest, while simultaneously providing at least 35 to 40 db of rejection for signals from other sources, including some of the outer Decca frequencies, such as 73 and 129 kHz, as indicated schematically on the substantially rectangular step-function type response A of FIG. 1. This response is flat or of substantially constant high amplitude over about this 30 kHz band, centered on the 100 kHz center or carrier frequency, while steeply dropping to reject the frequencies at the sides of said band (over a few kHz at about 115 and 85 kHz), and substantially constantly attenuating the frequencies above about 115 kHz and below about 85 kHz at a predetermined relatively high level of the order of the before-mentioned 35 to 40 db. This is thus considerably different from the steep-sided filter response of the prior Litton filter represented in FIG. 1 as "Prior Art 2." By widening the bandwidth of the filter A to about 30 kHz, the phase response over the band of interest is such that distortion is well manageable. The filter response A, as before indicated, of itself suffers from the fact that its rejection of far out-of-band frequency signals, as from proximal communication transmitters on the same or a nearby ship, is inadequate for good elimination of non-navigation other source communications service signals, such as 2 or 30 mgHz.

Further in accordance with the invention, thus, the elliptical filter A is linearly combined through an amplifier 1 with a two-pole 40 kHz synchronous tuned filter B, FIG. 2. The two separate poles $B_1$ and $B_2$, interconnected by the further amplifier 2, were tuned to provide a bell-shaped, substantially Bessel function response as shown on FIG. 1 at B. Note that the bandwidth of the filter response B (at 3 db down) is somewhat larger than that of the filter A, being preferably about 40 kHz, or again so far removed so as to not provide significant distortion in the band of interest;

namely, from 80 to 120 kHz. This limited-pole (two) filter B is wider than the prior Sperry filter in order to insure that it does not, as previously described, distort the pulse in the band of interest from 80 to 120 kHz. The characteristic B, FIG. 1, is of center-frequency maximum amplitude somewhat greater than that of filter A, and symmetrically gradually falls, outside the response A, though with points close to the approximately 85 and 115 kHz limits of the band thereof, ultimately intersecting and dropping far below (greater attenuation) the constant levels of curve A below and above about 85 and 115 kHz, respectively.

Through this critical adjustment and combination, it has been discovered that the resultant filtering response R is produced, having an initial bell-shaped symmetrical fall on each side of the center frequency, then dropping steeply (with substantially infinite slope) much as response A itself, and then flaring out with high attenuation for more remote frequencies. This has been found to provide adequate separation between ground- and sky-waves of 30 microsecond delay, while simultaneously eliminating the outer band (such as the 73 and the 129 kHz) Decca frequencies, and the far-removed strong higher frequencies of proximal transmitters (at, say, 120 db attenuation).

The design of FIG. 2, as embodied in actual equipment of the assignee of this invention, insured that saturation would not occur in any of the amplifier stages 1 and 2 by providing the three-pole elliptical filter A as early as possible, in order to eliminate the interferring signals before too much gain occurs in the amplifiers. It has also been found desirable to tap off from the first pole of the tuned synchronous filter element B, to an envelope differentiating circuit 3 which unfortunately allows considerable receiver noise to enter into the cycle selection process because the differentiator is essentially a high-frequency device. In order to obviate this problem, a further similar synchronously tuned pole filter $B_2'$ may be connected to the envelope differentiating circuit, FIG. 2, considerably improving the envelope or cycle selection response of the receiver. It is necessary that the further pole filter $B_2'$ match the pole filter $B_2$ in terms of bandwidth and delay, so that coherent sample triggers that are used for the phase lock loop, and the envelope lock loop, are all correlated. These subsequent circuits and other receiver details are not illustrated or described since they do not form part of the novelty of the invention, though they are well-known, as described, for example, in the before-cited publications.

Suitable basic configurations for elliptical and synchronous tuned filters that may be adjusted and critically combined as herein taught, are described, for example, in "Simplified Modern Filter Design" by P. R. Geffe, Hayden Book Co., 1963, and Fifth Edition, Reference Data For Radio Engineers, H. W. Sams and Company Inc. of International Telephone and Telegraph Company, 1968, respectively.

Further modifications will also occur to those skilled in this art, and all such are considered to fall within the spirit and scope of the invention as defined in the appended claims.

What is claimed is:

1. A process of signal discrimination between direct and delayed signal impulses, including Loran C and related navigation radio-frequency signals, that comprises, receiving such signals; filtering the signals with a substantially rectangular stepfunction amplitude-versus-frequency response characteristic having a flat substantially constant relatively high amplitude response over a predetermined frequency band containing the center frequency of the signals, while steeply rejecting the frequencies immediately to the sides of said band and substantially constantly attenuating frequencies there-above and there-below at a predetermined relatively high attenuation level; and further filtering the thusly filtered signals with a substantially bell-shaped response characteristic of maximum amplitude at said center frequency somewhat greater than the constant high amplitude, and substantially symmetrically gradually rejecting frequencies above and below, and ultimately with attenuation greater than said predetermined relatively high constant-attenuation of the step-function filtering characteristic, and bell-shaped response characteristic having points close to the same attenuation as the step-function filtering characteristic at the limits of said predetermined frequency band and points of intersection of the bell-shaped characteristic passing across and below the said predetermined relatively high attenuation level of said step-function characteristic, such that direct and delayed signal impulses are discriminated, while rejecting other source frequencies adjacent said predetermined frequency band and also far-removed frequencies of proximal sources.

2. A process as claimed in claim 1 and in which said bell-shaped response characteristic points of attenuation lie just outside said predetermined frequency band limits, such that the bandwidth thereat is somewhat greater than that of said predetermined frequency band.

3. A process as claimed in claim 2 and in which the first-named filtering is effected about a center frequency of substantially 100 kHz and with a wide band of substantially 30 kHz, and said further filtering is effected with a somewhat wider band of the order of substantially 40 kHz.

4. A process as claimed in claim 1 and in which said first filtering is effected substantially elliptically, and said further filtering is effected by tuning synchronously with limited poles.

5. A process as claimed in claim 4 and in which the elliptical filtering is effected with three poles, and said further filtering is effected synchronously by tuning with two poles.

6. A composite filter apparatus for signal discrimination in Loran C pulse navigation and related radio-frequency signal applications, having, in combination, a first filter means provided with a substantially rectangular step-function amplitude-versus-frequency response characteristic having a flat substantially constant relatively high amplitude response over a predetermined frequency band containing the center frequency of the signal, with a steeply falling frequency-rejecting response immediately to the sides of said band, flattening into a relatively constant high attenuation level for frequencies there-above and there-below; a second filter means connected with the first filter means to substantially linearly combine the response characteristics of both filter means, said second filter means having a substantially bell-shaped response characteristic of maximum amplitude at said center frequency somewhat greater than said constant high amplitude and symmetrically gradually falling on either side thereof but outside said predetermined frequency band, and ultimately intersecting and passing below upper and lower parts of said predetermined relatively high constant attenuation response so as to provide even greater attenuation for higher and lower frequencies, such that direct and delayed signal impulses may be discriminated, while rejecting other source frequencies adjacent said predetermined band and also far-removed frequencies of proximal sources.

7. A composite filter apparatus as claimed in claim 6 and in which the bandwidth of said second filter means is somewhat greater than that of said predetermined frequency band of the first filter means.

8. A composite filter apparatus as claimed in claim 7 and in which said center frequency is adjusted to about 100 kHz, with said bandwidth of said second filter means being about 40 kHz as compared with a first filter means bandwidth of about 30 kHz.

9. A composite filter apparatus as claimed in claim 6 and in which said first filter means comprises limited pole elliptical filter means and said second filter means comprises synchronously tuned limited-pole substantially Bessel function filters.

10. A composite filter apparatus as claimed in claim 9 and in which said elliptical filter means is three-poled and said synchronously tuned filter means is two-poled.

11. A composite filter apparatus as claimed in claim 10 and in which a path is provided tapped off the first of the two poles of the synchronously tuned filter means and containing a differentiating circuit connected with a further synchronously tuned pole-filter similar to the second pole of said two poles.

12. A composite filter apparatus for signal discrimination in Loran C pulse navigation and related radio-frequency signal applications, having, in combination, means for receiving said signal, and filter means connected with said receiving means and having an overall response characteristic substantially symmetrically disposed with respect to the signal center frequency that drops gradually in bell-shaped fashion over a limited predetermined frequency band, then steeply drops with substantially infinite slope and then more gradually flares out with high attenuation for more remote frequencies.

13. A composite filter apparatus as claimed in claim 12 and in which said center frequency is about 100 kHz, said predetermined frequency band is of the order of about 30–40 kHz, the region of steep response drop occurs over a few kHz, and high attenuation is produced above about 115 kHz and below about 85 kHz.

* * * * *